(12) United States Patent
Yamashita et al.

(10) Patent No.: US 8,113,567 B2
(45) Date of Patent: Feb. 14, 2012

(54) STRUCTURE FOR STORING VEHICULAR SEAT

(75) Inventors: Hajime Yamashita, Hamamatsu (JP); Yoshihide Itou, Toyota (JP); Fukuo Ogiso, Toyota (JP); Tamotsu Keinaga, Okazaki (JP); Ko Ishikawa, Toyota (JP); Hideyuki Kato, Toyota (JP); Susumu Watanabe, Hachioji (JP); Masaya Kometani, Aichi-ken (JP); Makoto Murakami, Nagoya (JP)

(73) Assignees: Toyota Boshoku Kabushiki Kaisha, Aichi-ken (JP); Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 12/524,767

(22) PCT Filed: Dec. 12, 2007

(86) PCT No.: PCT/JP2007/073937
§ 371 (c)(1),
(2), (4) Date: Oct. 28, 2009

(87) PCT Pub. No.: WO2008/093470
PCT Pub. Date: Aug. 7, 2008

(65) Prior Publication Data
US 2010/0117393 A1    May 13, 2010

(30) Foreign Application Priority Data

Jan. 31, 2007 (JP) .................................. 2007-020728

(51) Int. Cl.
*B60N 2/30* (2006.01)
(52) U.S. Cl. ............... 296/65.03; 296/65.09; 296/65.16; 296/64; 296/24.34; 296/37.8

(58) Field of Classification Search ............... 296/65.01, 296/64, 65.09, 65.13, 65.14, 65.03, 65.16, 296/24.34, 37.8; 297/15
See application file for complete search history.

(56) References Cited

U.S. PATENT DOCUMENTS

| | | | |
|---|---|---|---|
| 3,202,453 A | 8/1965 | Richards | |
| 5,868,451 A * | 2/1999 | Uno et al. | 296/66 |

(Continued)

FOREIGN PATENT DOCUMENTS

DE     10036553     9/2001

(Continued)

OTHER PUBLICATIONS

English language Abstract of JP 2003-054295, Feb. 26, 2003.
English language Abstract of JP 2004-262424, Sep. 24, 2004.
English language Abstract of JP 2004-338576, Dec. 2, 2004.

*Primary Examiner* — Glenn Dayoan
*Assistant Examiner* — Gregory Blankenship
(74) *Attorney, Agent, or Firm* — Greenblum & Bernstein, P.L.C.

(57) ABSTRACT

A structure of storing a vehicular seat according to one aspect of the invention is constituted by a seat detachably connected to a support base, and a storing space capable of storing the seat detached from the support base. The seat includes an engaging member is fixed to the support base by engaging an engaging portion provided at the support base. The storing space includes a bottom wall, side walls erected to an upper side from two left and right side edges of the bottom wall, and a depth wall erected from a depth edge of the bottom wall to the upper side, and is constituted to slide to store the seat. The seat includes fixing means at predetermined positions inside of the storing space. The fixing means are formed by shapes to slidingly receive and to fix the engaging member of the seat.

14 Claims, 11 Drawing Sheets

U.S. PATENT DOCUMENTS

| | | | |
|---|---|---|---|
| 5,890,758 A * | 4/1999 | Pone et al. ................... 297/15 |
| 5,979,964 A * | 11/1999 | Ban et al. ..................... 296/66 |
| 6,123,380 A * | 9/2000 | Sturt et al. ................ 296/65.09 |
| 6,279,982 B1 | 8/2001 | Nishimura et al. |
| 6,869,138 B2 * | 3/2005 | Rhodes et al. .............. 297/15 |
| 6,955,386 B2 * | 10/2005 | Rhodes et al. ............ 296/65.09 |
| 7,128,358 B2 * | 10/2006 | Perin ........................ 296/65.09 |
| 7,137,663 B2 * | 11/2006 | Tsujibayashi et al. ......... 297/15 |
| 7,393,038 B2 * | 7/2008 | Yajima et al. ............. 296/65.03 |
| 7,431,372 B2 * | 10/2008 | Imamura et al. .......... 296/65.09 |
| 7,578,536 B2 | 8/2009 | Yajima et al. |
| 7,686,367 B2 * | 3/2010 | Neale ........................... 296/64 |
| 2003/0094830 A1 * | 5/2003 | Kamida et al. ............ 296/65.09 |

FOREIGN PATENT DOCUMENTS

| | | |
|---|---|---|
| EP | 0958960 | 11/1999 |
| EP | 1400399 | 3/2004 |
| FR | 2878792 | 6/2006 |
| JP | 58-64527 | 4/1983 |
| JP | 62-49438 | 3/1987 |
| JP | 62-049438 | 3/1987 |
| JP | 2003-054295 | 2/2003 |
| JP | 2003-54295 | 2/2003 |
| JP | 2004-262424 | 9/2004 |
| JP | 2004-338576 | 12/2004 |
| WO | 99/19165 | 4/1999 |

\* cited by examiner

STRUCTURE FOR STORING VEHICULAR SEAT

TECHNICAL FIELD

The present invention relates to a structure for storing a seat arranged attachably and detachably to a support base and capable of being stored in a predetermined location when not used.

BACKGROUND ART

In recent years, there is proposed a vehicular seat arranged attachably and detachably to a floor in order to realize an inner vehicle space rich in a variety pertinently in accordance with a mode of use, an object of use or the like. For example, in JP-A-2004-338576, in order to ensure a walk through space in a front and rear direction in a vehicle, in second seats (second row seats) for three person's seats, a center seat is made to be attachable and detachable. Specifically, a seat base is constituted by seat legs comprising left and right stand frames, and a bottom frame hung over between upper portions of the stand frames, and by providing lock apparatus engaged with strikers arranged on a floor at lower faces of the left and right stand frames, the seat base is made to be attachable and detachable to and from the floor. Further, the seat base is made to be able to be folded. A seat cushion as a seating portion is mounted attachably and detachably on the bottom frame, and when the seat cushion is detached from the bottom frame, a seat back as a back rest is made to be able to be folded onto the bottom frame. Further, the center seat detached from the strikers on the floor and made to be compact by folding the seat base and the seat back is stored inside of a trunk room formed by recessing the floor between first seats (first row seats) and second seats (second row seats), or stored in a space downward from a bench seat of a third row.

However, the storing space of the center seat according to JP-A-2004-338576 is simply provided with a shape and a size capable of storing the center seat, and a structure fixing the center seat is not particularly provided. Under the circumstance, the center seat is rattled by a vibration or the like when running a vehicle, interference sound is emitted by colliding with a wall face of the storing space at that occasion, and an unpleasant feeling is given to a passenger. Although, when stored inside of the trunk room recessed to the floor, the center seat can be prevented from jumping out by arranging a lid at an upper face thereof, since fixing means is not provided, emittance of interference sound is unavoidable.

Thus, there is a need in the art to effectively restrain emittance of interference sound at inside of a storing space when a vehicular seat attachable and detachable to and from a support base is stored inside a predetermined storing space.

SUMMARY

A structure for storing a vehicular seat of the invention comprises a seat attachably and detachably arranged to a support base, and a storing space capable of storing the seat detached from the support base when the seat is not used. The seat is provided with an engaging member for mounting and to fix the seat to the support base by being engaged with an engaging portion provided at the support base. The storing space includes a bottom wall, side walls erected to an upper side from two left and right side edges of the bottom wall, and a depth wall erected to the upper side from a depth edge of the bottom wall and is constituted to slide to store the seat, and fixing means for fixing the seat is provided at a predetermined position at inside of the storing space. The fixing means at inside of the storing space is formed by a shape to slidingly receiving and fix the engaging member of the seat.

As an example of the engaging member of the seat, there are pin members projected to outer sides in a width direction from two left and right side faces of a lower portion of the seat. The fixing means at inside of the storing space are formed to project to inner sides in the width direction from the two left and right side walls of the storing space. The fixing means can be constituted by a rail member having a fixing portion of a shape of capable of supporting to fix the pin member to surround the pin member from a lower side, a depth side, and an upper side at a depth end side of the storing space of the fixing means.

A lower face of the seat is formed with a projection at a position of a side opposed to the engaging member in a front and rear direction, and the bottom wall of the storing space is formed with a recess portion of a shape in correspondence with the projection of the seat. Further, when the seat is stored to inside of the storing space, the projection of the seat is fitted to the recess portion at inside of the storing space.

It is preferable to make a height dimension from the bottom wall of the storing space to the fixing portion larger than a height dimension from the lower face of the seat to the engaging member. Thereby, when the seat is stored to inside of the storing space, and the engaging member of the seat is supported and fixed by the fixing portion of the fixing means, a side of the engaging member of the seat is brought into a state of being floated up from the bottom wall of the storing space.

When the engaging member of the seat is constituted by a pin portion in a shape of a round bar fixed to the seat, and a flange portion integrally formed with a front end of the pin portion, it is preferable that the fixing portion formed at the depth end of the fixing means is formed with a groove capable of receiving the flange portion of the engaging member. Thereby, the engaging member can smoothly be introduced to the fixing portion.

When the engaging member is provided at a side face of an under cover covering the lower face of the seat and having a width narrower than a width dimension of the seat, it is preferable that front ends of the engaging members are not projected to outer sides at least from left and right side faces of the seat. As such a mode, there is a case in which the front ends of the engaging members and the left and right side faces of the seat are made to be substantially flush with each other, a case in which the front ends of the engaging members are disposed on inner sides in the width direction more than the left and right side faces of the seat or the like. Thereby, when the seat is slid to be inserted to inside of the storing space, it is avoided that the engaging member is brought into contact with the side wall of the storing space, and it is not necessary to form a recess portion or the like for avoiding collision of the engaging member with the side wall of the storing space.

When a bulged portion of a width wider than a rear portion of the under cover formed with the engaging member is formed at a front end portion of the under cover, it is preferable that left and right side faces of the bulged portion are disposed on inner sides in the width direction more than the front ends of the engaging members. Thereby, by pertinently designing an amount of projecting the fixing means formed at inside of the storing space, when the seat is slid to be inserted to inside of the storing space, it can freely be selected whether the engaging member is slid above the fixing means, or whether the bulged portion of the under cover is slid thereabove.

For example, when a width dimension between the fixing means formed at the two left and right side walls of the storing space is made to be larger than a width dimension of the bulged portion of the under cover, in sliding to insert the seat to inside of the storing space, the engaging member is slid to move above the fixing means. Conversely, when the width dimension between the two fixing means formed at the two left and right side walls of the storing space is made to be smaller than the width dimension of the bulged portion of the under cover, in sliding to insert the seat to inside of the storing space, the bulged portion is slid to move above the fixing means.

It is preferable that the projection is formed to project at inside of a recess portion formed by being recessed to the upper side at a center portion in a width direction of a lower face of the under cover, and the recess portion of the storing space fitted to the projection is formed to recess into a raised portion formed in a shape of being raised to the upper side at a center portion in a width direction of the bottom wall of the storing space. At this occasion, the width dimension of the raised portion is made to be slightly smaller than the width dimension of the recess portion of the under cover. Thereby, when the seat is slid to be inserted to inside of the storing space, the recess portion of the under cover is slid to be fitted to the raised portion, and therefore, a shift to left and right sides of the seat can be avoided.

When the seat is a center seat installed between two left and right side seats arranged by being spaced apart from each other by a predetermined interval therebetween in a width direction, in second row seats arranged in a front and rear direction of a vehicle, and is operated to detach from the support base to a front side of the vehicle, it is preferable that the storing space is a console box provided between two left and right first row seats, and an opening for inserting the seat is formed on a rear side of the vehicle.

In this case, the fixing means is provided on a depth side of the projection at inside of the storing space. Thereby, the seat is slid to be inserted to inside of the storing space from the front side. At the same time, the fixing portion of the fixing means may be inclined to the upper side.

Further, the projection may be provided on the depth side of the fixing means at inside of the storing space. In this case, the seat is slid to be inserted to inside of the storing space from a rear side. At this occasion, it is preferable to incline the fixing means to the lower side.

According to the invention, the storing space is constructed by a constitution of capable of storing the seat while sliding the seat, further, the fixing means at inside of the storing space is formed by a shape of slidingly receiving to fix the engaging member of the seat, and therefore, an operation of storing and fixing the seat can easily be carried out. Particularly, when the storing space is provided on a front side in a direction of detaching the seat, the seat can be stored to inside of the storing space as it is continuously from an operation of detaching the seat from the support base, and the storing operation can smoothly and easily be carried out. By providing the fixing means for fixing the seat at inside of the storing space, the seat can firmly be fixed to inside of the storing space, and emittance of interference sound by a vibration in running or the like can be restrained.

Further, the fixing mans at inside of the storing space is constituted by the rail member, and therefore, the pin member of the seat can precisely be slid to be guided to the fixing portion at the depth end of the storing space, and a failure in fixing the seat can be avoided. Further, the seat is fixed by engaging the rail member and the pin member, and therefore, a constitution thereof can be simplified. At this occasion, the fixing portion supports the pin member to surround the pin member from the lower side, the depth side, and the upper side, and therefore, a movement in an up and down direction of the seat can firmly be restricted. When the seat is fixed by the pin member for mounting the seat to the support base, the structure of the seat can efficiently and effectively be utilized, and it is not necessarily needed to purposedly provide a mechanism for fixing the seat to inside of the storing space.

Furthermore, when there is constructed a constitution of capable of fitting to fix the seat also by the projection, while restricting rattling in an up and down direction by the fixing portion, also rattling in the front and rear direction can be restrained by the fitting portion of the projection, and therefore, emittance of interference sound of the seat and the wall face of the storing space can further effectively be restrained.

When the seat is stored to be fixed to inside of the storing space, a side of the engaging member of the seat is brought into a state of being floated up at inside of the storing space, that is, separated from the bottom wall of the storing space, and therefore, the emittance of the interference sound can further effectively be restrained. Further, when the seat is inclinedly fixed, the self weight of the seat is concentrated on the portion of fitting the projection, and therefore, it can be restricted that the projection portion brought into contact with the bottom wall of the storing space is jumped up to the upper side. Thereby, there is achieved also the effect of preventing that the projection is unpreparedly drawn out from the recess portion.

BEST MODE FOR CARRYING OUT THE INVENTION

Although an explanation will be given of an embodiment of a structure for storing a vehicular seat according to the invention in reference to the drawings as follows, the invention is not limited thereto but can variously be changed within the range not changing the gist of the invention.

Figure 1:
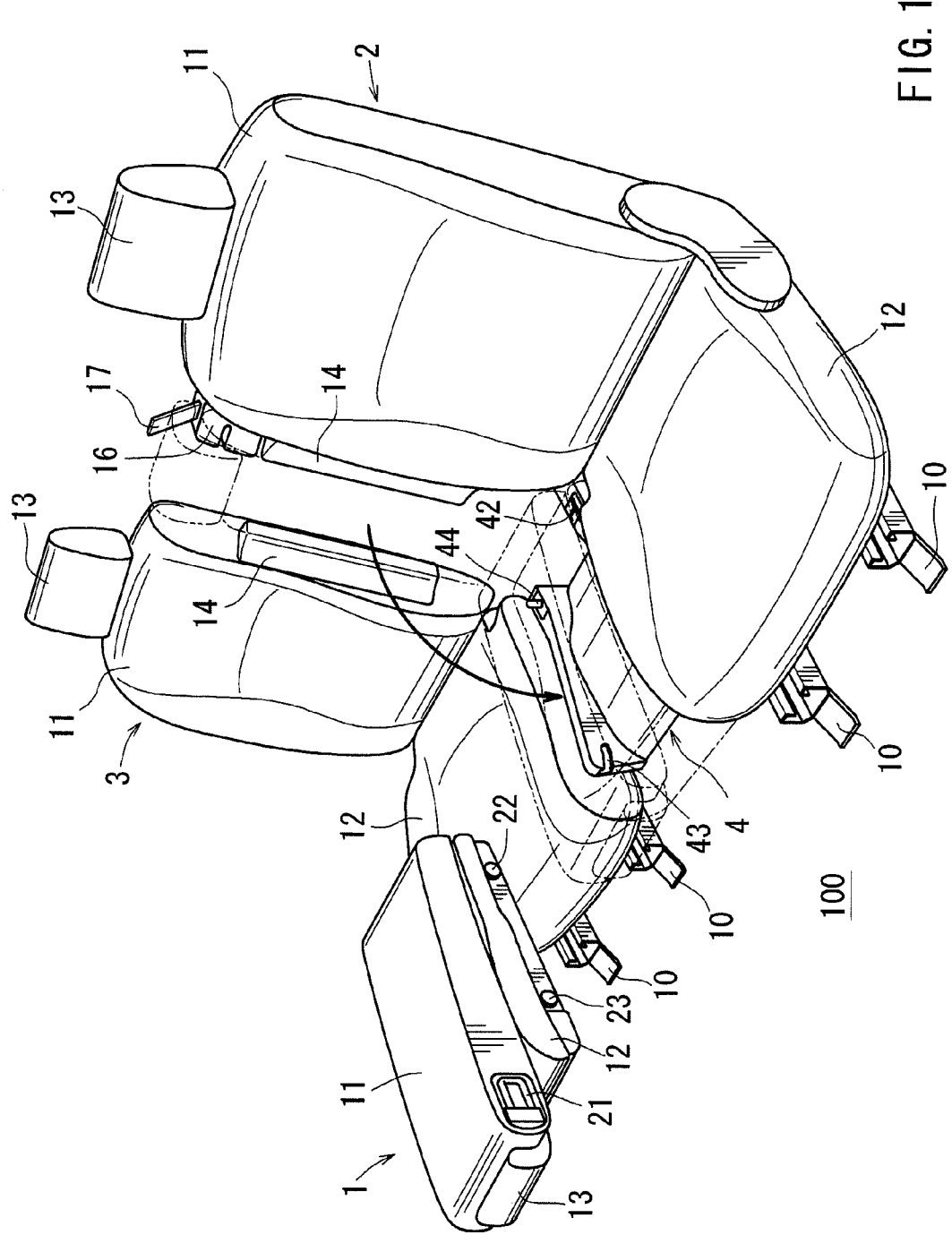
FIG. 1 is a perspective view showing an arrangement of a vehicular seat according to the invention.
Figure 4:
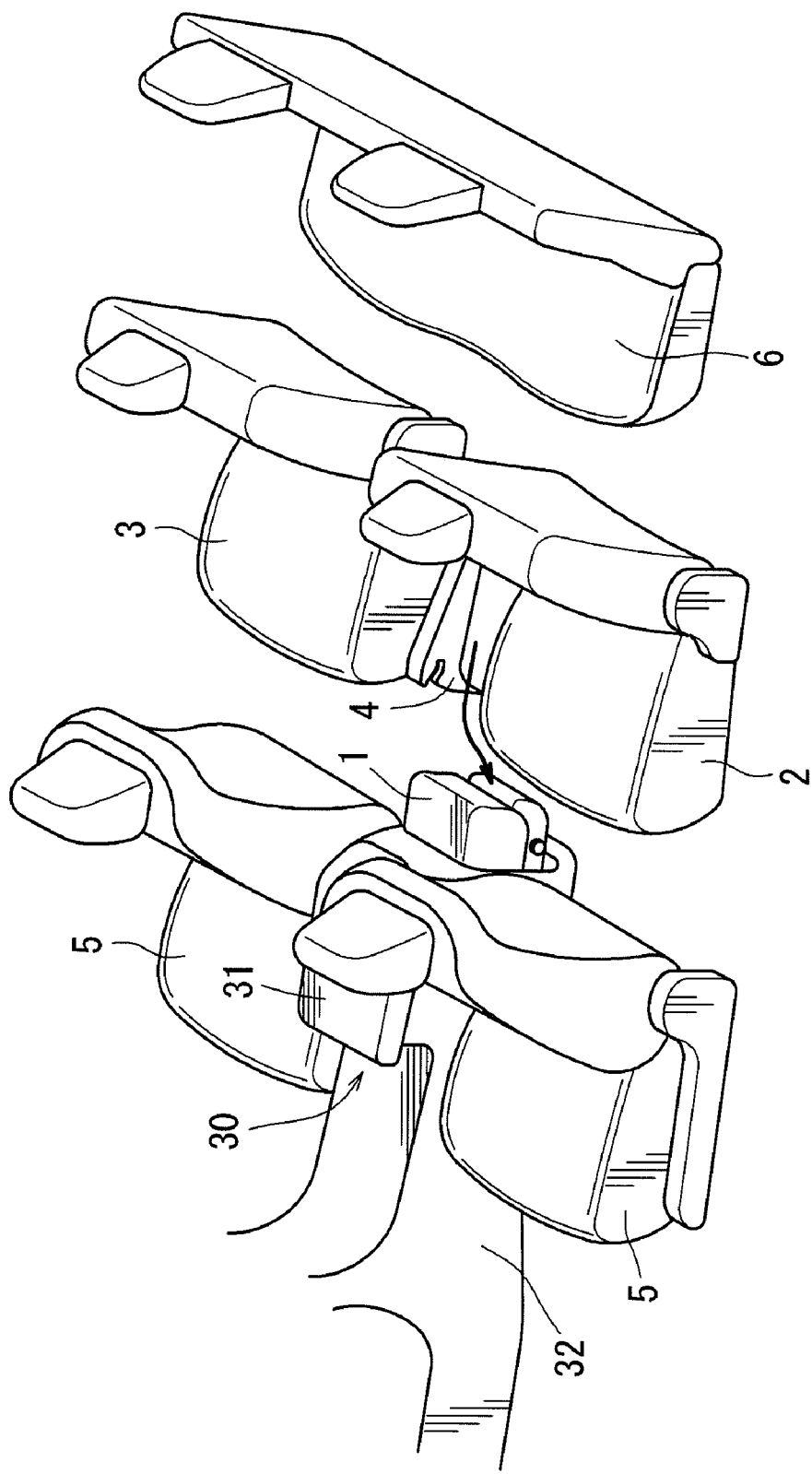
FIG. 4 is a perspective view showing a positional relationship between a vehicular seat and a storing space.

First, an explanation will be given of a mechanism of attaching and detaching a vehicular seat capable of being stored in a storing space to and from a support base of a vehicular seat. As shown by FIG. 1, the vehicular seat 1 is installed as a center seat on a floor 100 between two left and right side seats 2·3 arranged to be spaced apart from each other by an interval therebetween in a width direction thereof. As shown by FIG. 4, the center seat 1 and the side seats 2·3 are arranged as second row seats for three passengers seats in three row seats arranged in a front and rear direction of the vehicle. According to the center seat 1, a lateral width thereof is formed to be narrower than those of the two side seats 2·3, and is attachably and detachably mounted to a support base 4 in a shape of a saucer provided between the left and right side seats 2·3. Therefore, the center seat 1 is constituted as a seat of an auxiliary role capable of being used by being pertinently attached and detached.

Figure 2:
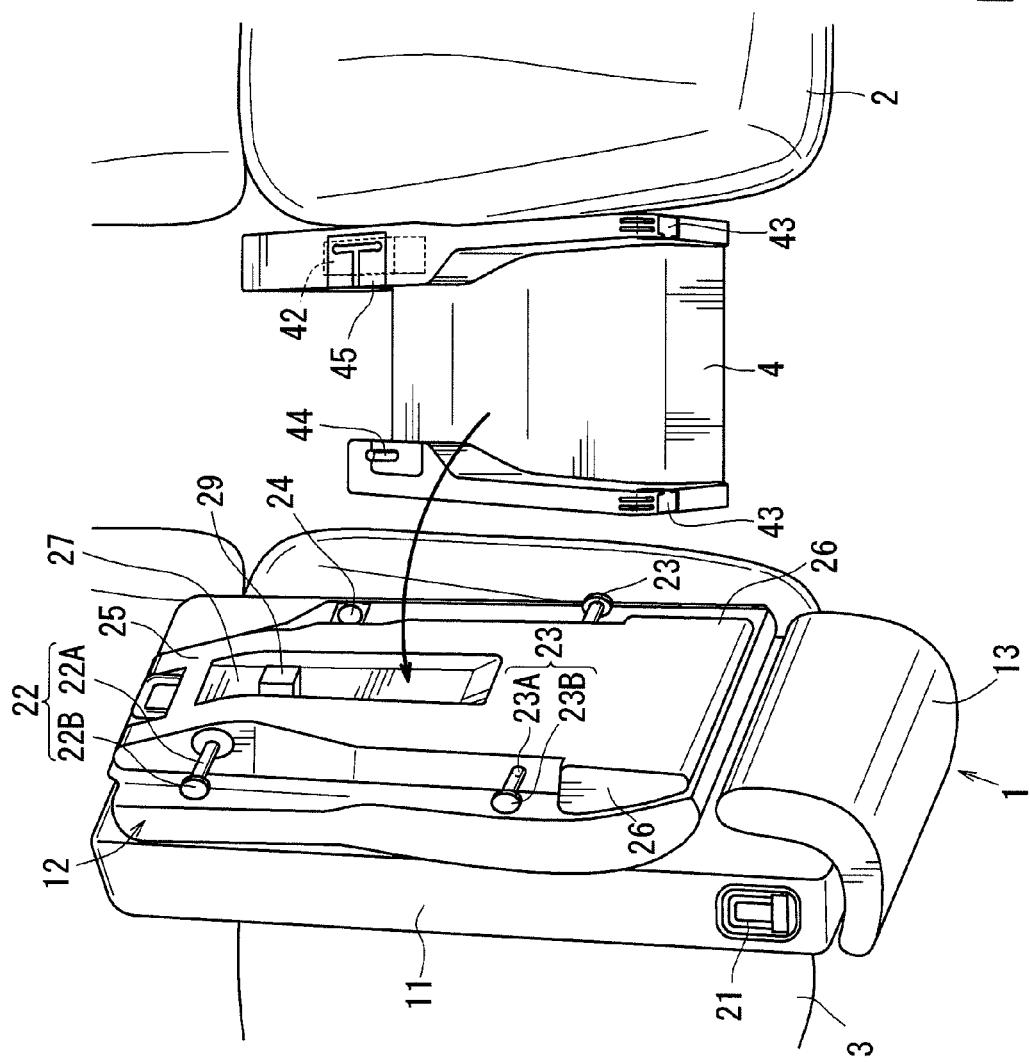
FIG. 2 is an outlook view showing constitutions of a center seat and a support base.

As shown by FIG. 2, the support base 4 supporting the center seat 1 from a lower face thereof is extended from the left side seat 2 in a state of being stretched therefrom in the width direction, and is integrally fixed to an inner frame of the left side seat 2. Referring back to FIG. 1, the two side seats 2·3 are made to be able to be slid in the vehicle front and rear direction on slide rails 10 provided between the side seats 2·3 and the floor 100. Therefore, the support base 4 integrally arranged with the left side seat 2 is made to be moved to be slid in the vehicle front and rear direction in synchronism with a sliding movement of the left side seat 2 in the vehicle front and rear direction. Thereby, in a state of mounting the center seat 1 onto the support base 4, also the center seat 1 is slid in the vehicle front and rear direction integrally with the left side seat 2.

The interval of the two side seats 2·3 is set to a width by which a person can pass therethrough in the front and rear direction of the vehicle (for example, about 400 mm). Therefore, in a state of detaching the center seat 1 from the support base 4 as shown by FIG. 4, there is constituted a walk through space in which a passenger can come and go by passing the interval of the two side seats 2·3. Further, the space can be used also as a space of enabling a passenger seated on a third row seat 6 to stretch out feet in a front direction. This is significant because the support base 4 serves to function as a stepping base when a person passes therethrough, or a foot rest when the foot is stretched out thereon.

As shown by FIG. 1, the two side seats 2·3 include seat backs 11 as back rests, seat cushions 12 as seating portions, head rests 13 supporting the head portions, and arm rests 14 as arm rests. According to the seat back 11, an angle thereof is made to be able to be adjusted in the front and rear direction relative to the seat cushion 12 by a well-known reclining mechanism (not illustrated) arranged at inside of the seat. Further, the arm rest 14 is made to be adjusted between an erected attitude of a state of not being used and a sideways falling attitude in a state of being used relative to the seat back 11 by a hinge (not illustrated) arranged at inside of the seat.

As shown by FIG. 1 and FIG. 2, the center seat 1 includes the seat back 11 as a back rest, the seat cushion 12 as a seating portion, and the head rest 13 supporting the head portion, and is made to be proximate to or brought into close contact with the two side seats 2·3 in a state of being mounted onto the support base 4 as shown by imaginary lines of FIG. 1. Further, the seat back 11 is urged always in a front folding direction by a winding spring, not illustrated, arranged at a portion of connecting the seat back 11 and the seat cushion 12 at inside of the center seat 1. The center seat 1 is made to be attachable and detachable onto and from the support base 4 by engaging an engaging member fixedly provided to a lower face side of the seat cushion 12, and an engaging portion of the support base 4 in correspondence therewith.

A striker 21 in a shape of a gate type frame is arranged at an upper portion of a side face of the seat back 11 of the center seat 1 on a side of the left side seat 2, that is, a shoulder portion thereof. The gate type striker 21 is made to be able to be inclined between an escaping attitude in line with the side face of the seat back 11 by being folded in a lower direction, and a projecting attitude extended from the side face of the seat back 11 horizontally to an outer side in the width direction. In a state of mounting the center seat 1 onto the support base 4, in an attitude of being used by erecting the seat back 11 relative to the seat cushion 12 as shown by the imaginary lines of FIG. 1, the gate type striker 21 is engaged to be locked by a back lock apparatus 16 provided at a shoulder portion of the seat back 11 of the left side seat 2. Thereby, according to the seat back 11 of the center seat 1, an erecting attitude (attitude of being used) thereof is maintained by the back lock apparatus 16, and when a lock state of the back lock apparatus 16 is released, the seat back 11 is brought down to a front side by an urge force of the winding spring. The back lock apparatus 16 is arranged on the outer side of the side face of the seat back 11 of the left side seat 2 on the side of the center seat 1, and the shoulder portion on an upper side of the arm rest 14, by a height the same as that of the gate type striker 21 of the center seat 1. A strap 17 is extended extractably and retractably from an upper face of the back lock apparatus 16. When the strap 17 is operated to pull, the lock state of the back lock apparatus 16 is operated to be released. The gate type striker 21 is constituted to be maintained in the projecting attitude by the urge force of the spring, not illustrated, when the seat back 11 is brought into the erecting attitude, and to be brought into the escaping attitude as shown by a bold line of FIG. 1 in accordance with a folding operation of the seat back 11.

Figure 3:
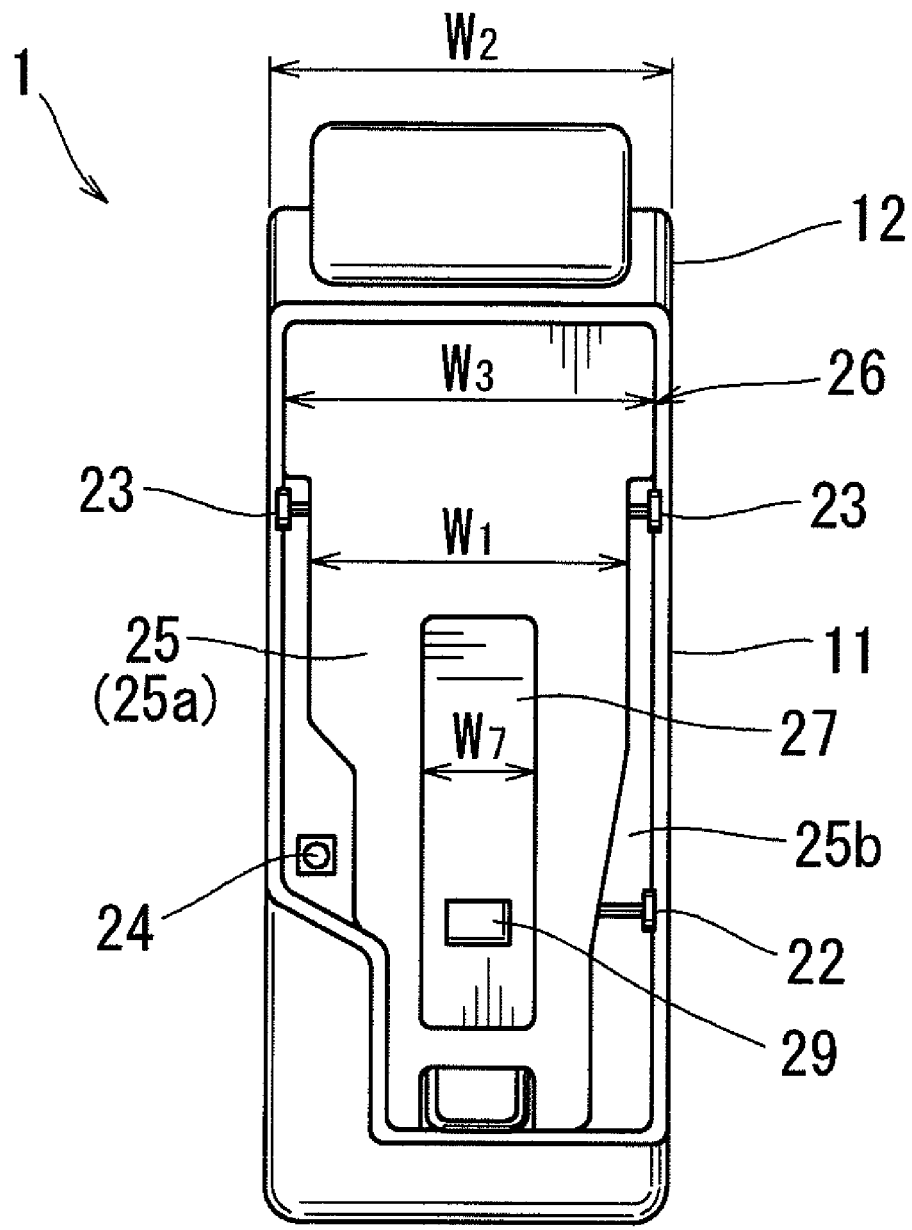
FIG. 3 is a bottom view of a center seat.

As shown by FIG. 2 and FIG. 3, the seat cushion 12 of the center seat 1 is respectively provided with a striker 22 in a shape of a pin on a rear side of the seat, two left and right lock pins 23·23 on a front side of the seat, and an engaging hole 24 on the back side of the seat and on a side opposed to the striker 22 in the width direction as engaging members engaged with engaging portions of the support base 4. The left and right lock pins 23 on the front side are provided at two left and right side faces of the lower portion of the center seat 1. In details, the lock pins 23 are projected to outer sides in the width direction from two left and right side faces of an under cover 25 made of a synthetic resin covering a lower face side of the seat cushion 12. Further, although the under cover 25 includes a cover main body portion 25a having a predetermined thickness, and flange portions 25b extended to outer sides in the width direction from upper ends of two left and right sides of the cover main body portion 25a, when the under cover 25 is referred to in the invention, only the cover main body portion 25a excluding the flange portions 25b is shown. Also the striker 22 on the rear side of the cover is projected to the outer side in the width direction from the side face of the under cover 25. The striker 22 and the two lock pins 23 are constituted by pin portions 22A·23A in shapes of round bars, and flange portions 22B·23B continuously formed integrally with front ends thereof. As is well shown in FIG. 3, a width dimension $W_1$ of the under cover 25 is smaller than a width dimension $W_2$ of the center seat 1, and the front ends (flange portions 22B·23B) of the striker 22 and the two lock pins 23 are disposed more or less on inner sides in the width direction from two left and right side faces of the center seat 1. Although the striker 22 and the two lock pins 23 are constituted by the same shape, since functions thereof differ as described later, member names of the two members 22·23 are made to differ from each other. The engaging hole 24 is bored at the lower face of the seat cushion 12 to penetrate in an up and down direction.

Figure 6:
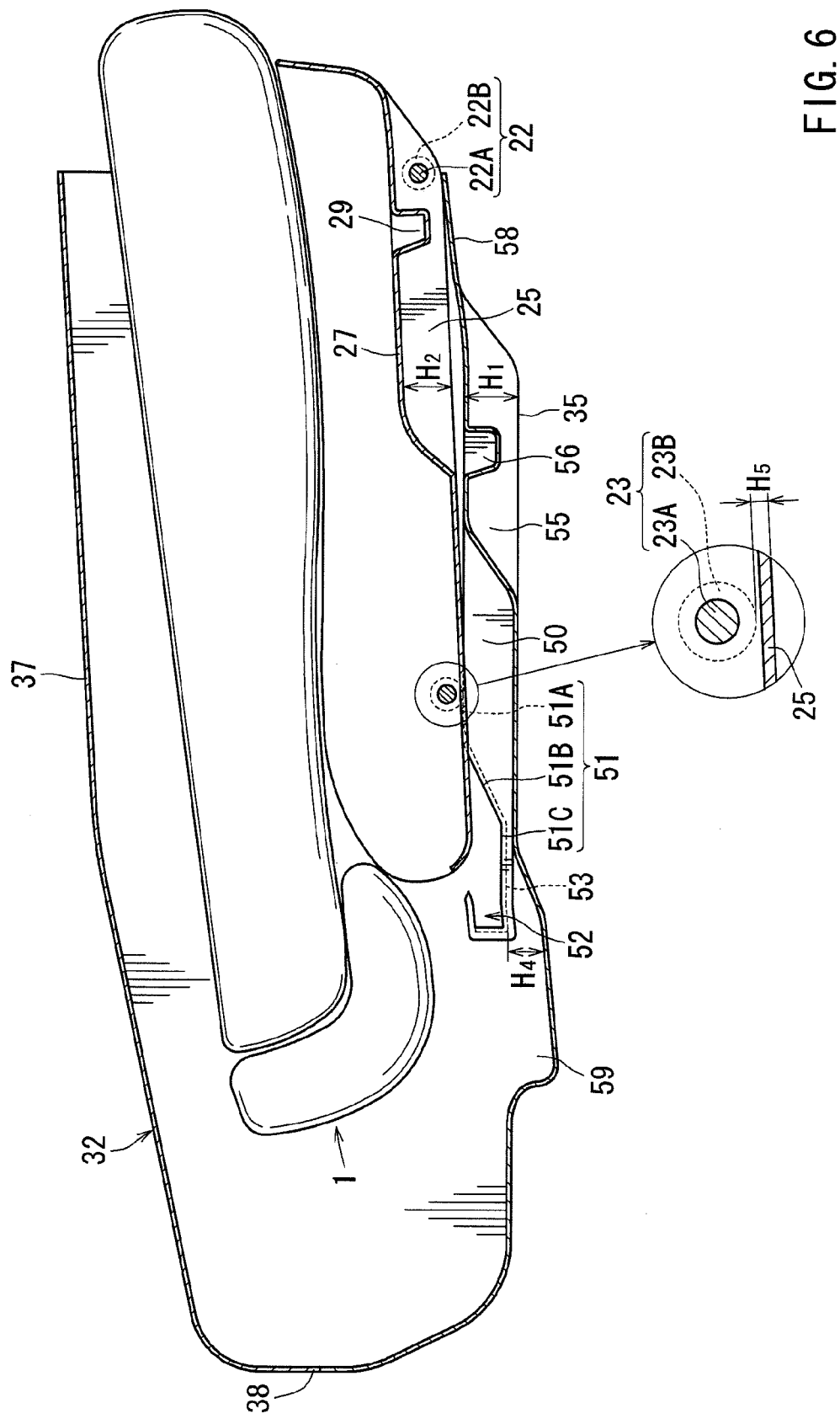
FIG. 6 is a sectional side view showing an initial state of storing a center seat inside a storing space according to Embodiment 1.

A front end portion of the under cover 25 is formed with a bulged portion 26 having a width wider than that of a rear portion formed with the striker 22 and the lock pins 23. However, a width dimension $W_3$ of the bulged portion 26 is smaller than the width dimension $W_2$ of the center seat 1. Further, front ends of the striker 22 and the lock pins 23 (flange portions 22B•23B) are disposed more or less on outer sides in the width direction from the left and right side faces of the bulged portion 26. A recess 27 in a shape of a groove is formed at a center portion in the width direction of the lower face of the under cover 25, although the recess 27 is not directly related to attachment and detachment to and from the support base 4. The recess 27 is formed from a center in the front and rear direction of the under cover 25 slightly proximate to the front side over to a rear end thereof. A projection 29 is formed to be projected from a bottom face of the recess 27 to a lower side integrally therewith at a center portion in the width direction of the recess 27 and a portion proximate to the rear side in the front and rear direction, that is, at the center portion in the width direction of the lower face of the under cover 25 and at the portion proximate to the rear side in the front and rear direction. However, as shown by FIG. 6, a lower face of the projection 29 is disposed at a position upward from the lower face of the under cover 25.

On the other hand, in FIG. 2, the support base 4 is arranged with a cushion lock apparatus 42, lock recess portions 43•43, a lock pin 44 as engaging portions of positions and shapes respectively in correspondence with the striker 22, the two lock pins 23•23, and the engaging hole 24 of the center seat 1. The left and right lock recess portions 43•43 are constructed by a constitution of being provided at a front face of the support base 4 and directing opening portions in the recess shape to the front side. The lock pin 44 is formed to project from an upper face of the support base 4 in an upper direction. The receiving port of the cushion lock apparatus 42 is opened in an upper direction, and constitutes a mechanism of receiving to lock the striker 22 from the upper side. The upper face of the cushion lock apparatus 42 is covered by a flexible rubber fin 45 having a cut in a T-like shape to be made to be unable to be recognized optically from outside.

Next, a mechanism of attaching and detaching the center seat 1 will be explained. When the center seat 1 is mounted to the support base 4, the center seat 1 is moved to slide to the rear side to slide on the support base 4 in a state of lifting the rear side of the center seat 1 by making the under cover 25 of the center seat 1, in a folded attitude state, disposed on the lower side. Thereby, the pair of left and right lock pins 23•23 provided on the front side of the seat cushion 12 of the center seat 1 are brought into the left and right lock recess portions 43•43 opened at the front face of the support base 4 in a sliding state.

Further, when the two lock pins 23•23 are brought into contact with depth ends of the two lock recess portions 43•43 to be brought into a state of restricting the center seat 1 from being moved to slide to the rear side, the rear side of the center seat 1 is operated to drop by constituting pivoting centers by the two lock pins 23•23. Thereby, the lock pin 44 of the support base 4 is inserted into the engaging hole 24 provided on the rear side of the seat cushion 12 of the center seat 1 in a positioning state. Further, by further dropping the rear side of the center seat 1, the striker 22 is brought from the cut of the rubber fin 45 to an inner portion, and engaged to be locked by the cushion lock apparatus 42. Thereby, the center seat 1 is mounted to be fixed to the support base 4 in respective directions of front and rear, left and right, up and down directions in a state of restricting rattling. Finally, by erecting the seat back 11 of the center seat 1 to the rear side, and engaging to lock the gate type striker 21 to the back lock apparatus 16 of the left side seat 2, the center seat 1 is maintained in the state of being used.

On the other hand, in order to operate to detach the center seat 1 from the support base 4 from the mounting state, first, the strap 17 of the back lock apparatus 16 is operated to pull to an upper side. Then, the gate type striker 21 of the center seat 1 is released from being engaged with the back lock apparatus 16. Thereby, the seat back 11 of the center seat 1 is brought down to the front side by the urge force of the winding spring. Next, by releasing the cushion lock apparatus 42 arranged on the rear side of the support base 4 by operating a release lever (not illustrated) provided at a back face of the support base 4, and lifting the rear side of the center seat 1 to the upper side under the state, the striker 22 is released from being engaged with the cushion lock apparatus 42 and the engaging hole 24 is released from being engaged with the lock pin 44, respectively. The lock pins 23 are drawn out from the lock recess portions 43 by moving the center seat 1 to the front side from the state as they are, and therefore, the center seat 1 can be detached from the support base 4.

Next, an explanation will be given of a structure for storing the center seat 1 attachable and detachable to and from the support base as described above.

Embodiment 1

As shown by FIG. 4, the center seat 1 detached from the support base 4 is stored to a console box 30 arranged between left and right first row seats 5•5. The console box 30 is constituted by an upper container 31 of containing a small article or the like, and a lower container 32 having an opening on a vehicle rear side, and the center seat 1 is contained at inside of the container 32. Further, the console box 30 is disposed on the front side of the center seat 1, the opening of the container 32 is formed to the rear side, thereby, the center seat 1 is constituted to be able to be stored efficiently to the storing space on the front side as it is continuously from the operation of detaching the center seat 1 from the support base 4.

In FIG. 5 through FIG. 9, the container 32 shows a shape of a longitudinally prolonged hexahedron partitioned by a bottom wall 35, left and right side walls 36•36 erected to the upper side from two left and right side edges of the bottom wall 35, a ceiling wall 37 closing the upper face of the container 32 over the left and right side walls 36•36, and a depth wall 38 of closing a depth side of the container 32 erected to the upper side from a depth edge of the bottom wall 35. Further, lower sides of the drawings of FIG. 6 through FIG. 9 constitute the front side of the vehicle and the depth side of the container 32 in the specification, an upper sides of the drawings of FIG. 6 through FIG. 9 constitute the rear side of the vehicle and the rear side of the side of the opening of the container 32 in the specification. The container 32 is provided with a height dimension having an allowance to a degree of capable of more or less operating the attitude of the center seat 1 inside the containing space as described later while being formed by a shape of capable of containing the center seat 1 precisely to inside thereof.

Figure 5:
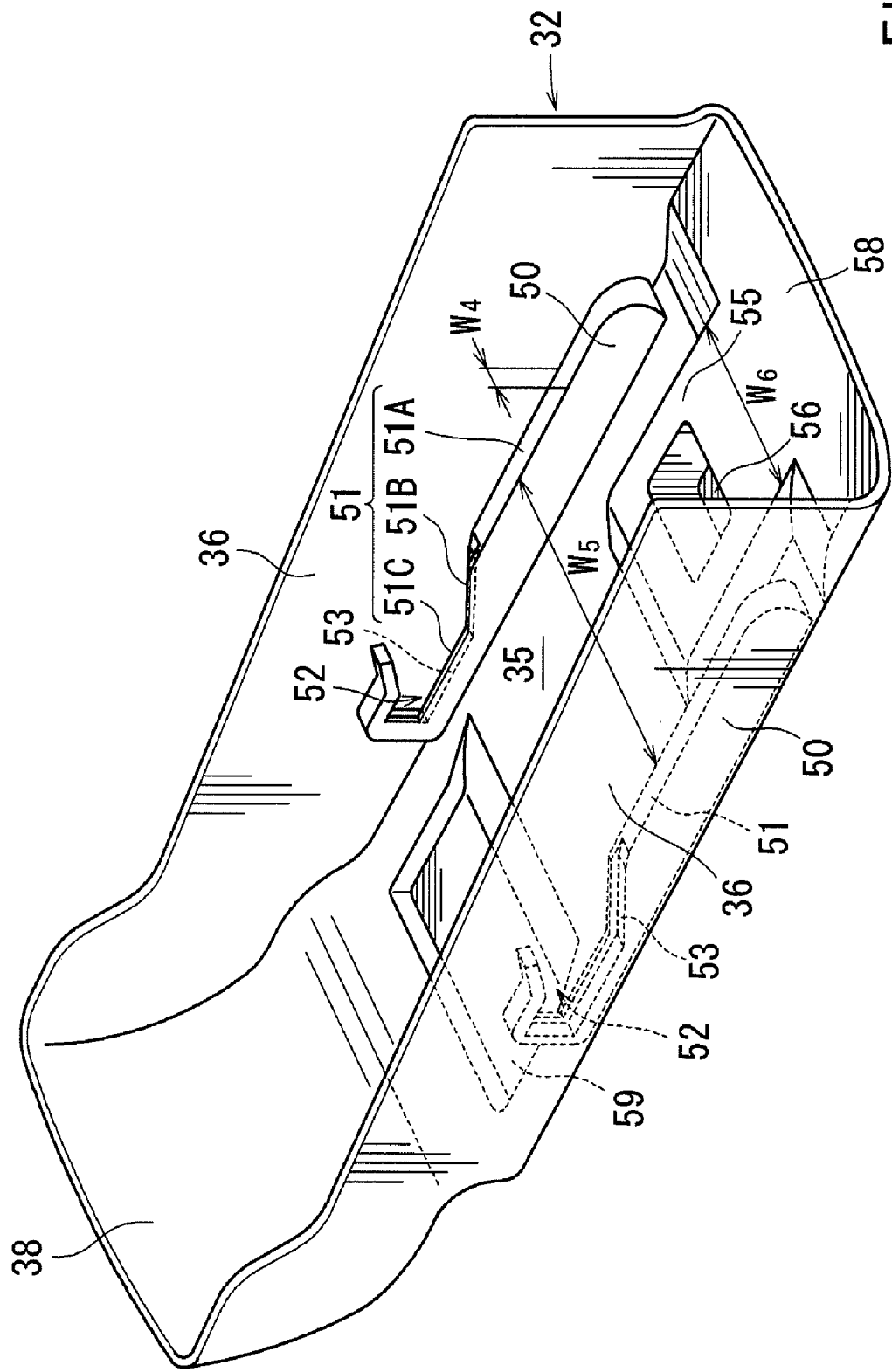
FIG. 5 is a perspective view showing an inner structure of a container.

In FIG. 5, inner faces of the left and right side walls 36•36 are provided with stretching portions 50•50 formed to stretch to inner sides in the width direction, and an upper face of the stretching portion 50 is constituted by a shape of a rail. In detail, the stretching portions 50 are formed at lower ends of the left and right side walls 36•36 in the front and rear direction along the two side walls 36, and are formed by a shape of a hook falling sideways. Therefore, a rail 51 of the upper face is constituted by a horizontal portion 51A at a predetermined height position, an inclined portion 51B inclined to a lower side continuously to a depth side of the horizontal portion 51A, and a stepped difference horizontal portion 51C lowered by one stage more than the horizontal portion 51A continuously to a depth side of the inclined portion 51B. Further, a depth end of the rail 51 (stepped difference horizontal portion 51C) is provided with a fixing portion 52 of a shape of surrounding the depth side and the upper side. A dimension of stretching the stretching portion 50, that is, a width dimension $W_4$ of the rail 51 is to a degree of being slightly larger than thicknesses of the flange portions 22B•23B of the striker 22 and the lock pin 23 of the center seat 1, and a width dimension $W_5$ between the two left and right stretching portions 50•50 is set to be wider than the width dimension $W_3$ of the bulged portion 26 of the under cover 25 of the center seat 1. Thereby, it is designed such that when the center seat 1 is slidingly inserted into the container 32, only the lock pin 23 of the center seat 1 is slid on the rail 51, and the bulged portion 26 of the under cover 25 is not brought into contact with the rail 51. Further, at ends of the inclined portion 51B and the stepped difference horizontal portion 51C of the rail 51 on the side of the side wall 36, a groove 53 of a width dimension capable of receiving the flange portions 22B•23B of the striker 22 and the lock pin 23 of the center seat 1 is formed. The groove 53 is communicated also with a depth face of the fixing portion 52 disposed on a depth side of the rail 51. Further, the stretching portion 50 is purposely formed providing the rail 51 in order to prevent the rail 51 from being destructed by a weight of the center seat 1 sliding on the rail 51, thus a strength thereof is ensured.

At a center portion in a width direction on a rear side (opening side) of the bottom wall 35 of the container 32, a raised portion 55 is formed to be built up from the bottom wall 35 to an upper side integrally therewith, and at a center portion of the raised portion 55, a fitting recess portion 56 recessed to a lower side from an upper face of the raised portion 55 is formed. A width dimension $W_6$ and a dimension $H_1$ raised from the bottom wall 35 of the raised portion 55 (refer to FIG. 6) are set to be substantially equivalent to a width dimension $W_7$ (refer to FIG. 3) of the recess 27 formed at the lower face of the center seat 1 and a recess dimension $H_2$ (refer to FIG. 6) from the lower face of the under cover 25. In detail, the width dimension $W_6$ of the raised portion 55 is slightly smaller than the width dimension $W_7$ of the recess 27, and the dimension $H_1$ raised from the bottom wall 35 of the raised portion 55 is slightly larger than the dimension $H_2$ of being recessed from the lower face of the under cover 25 of the recess 27. The fitting recess portion 56 is formed by a size and a shape of capable of being fitted to the projection 29 of the lower face of the center seat 1.

A rear edge portion 58 (opening side) of the bottom wall 35 of the container 32 is at a height the same as the raised dimension $H_1$ of the raised portion 55, the center portion in the front and rear direction of the bottom wall 35 by being lowered from the rear edge portion 58 to the depth side of the containing space becomes horizontal, and a recess portion 59 inclined and lowered therefrom towards the further depth side of the containing space is continuously formed.

Next, a structure for storing and to fix the center seat 1 to the container 32 of the above-described structure will be explained in reference to FIG. 6 through FIG. 9. Continuously to the operation of detaching from the support base 4, the center seat 1 is slidingly inserted from the front face to the storing space at inside of the container 32 while supporting the rear side of the center seat 1 by the hand. Then, first, the lower face of the center seat 1 is advanced to the depth side while being brought into sliding contact with the rear edge portion 58 of the container 32, as shown by FIG. 6, the lock pin 23 arranged on the front side of the center seat 1 is brought into sliding contact with the rail 51. During a time period in which the lock pin 23 of the center seat 1 shown in FIG. 6 is slidingly moved on the horizontal portion 51A of the rail 51, the center seat 1 is separated (floated up) from other than the rear edge portion 58 of the bottom wall 35 of the container 32.

Figure 7:
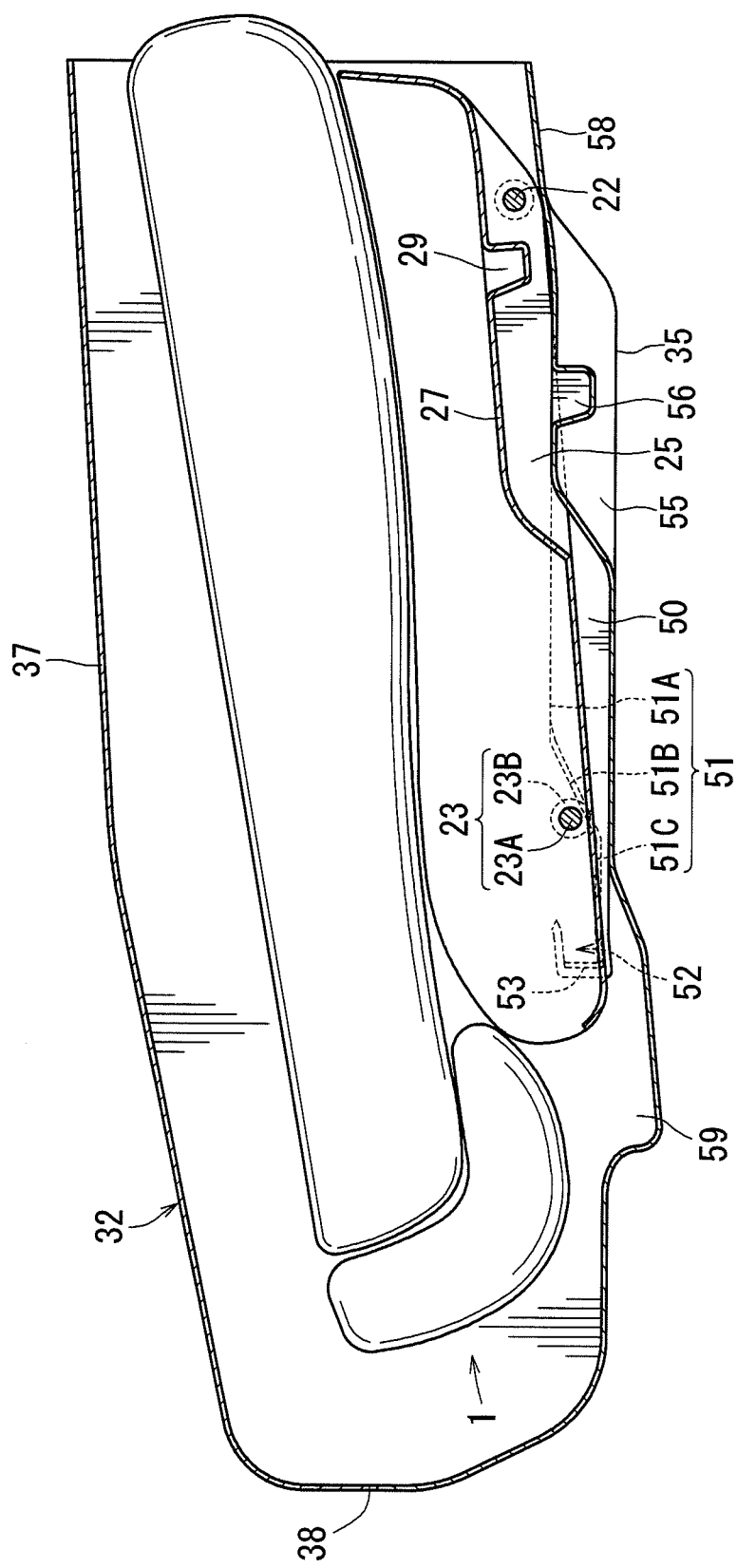
FIG. 7 is a sectional side view showing a middle state of storing the center seat inside of the storing space according to Embodiment 1.

When the center seat 1 is slid to the depth side of the container 32 further from the state shown in FIG. 6, as shown by FIG. 7, the lock pin 23 of the center seat 1 comes to the inclined portion 51B of the rail 51, and the flange portion 23B of the lock pin 23 is fitted to the groove 53 formed to be recessed from the inclined portion 51B. At this occasion, by lowering the inclined portion 51B to the depth side, the front side of the center seat 1 is inclined to the lower side. Thereby, the lock pin 23 is avoided from being drawn out from the groove 53 by a self weight of the center seat 1. Further, also in the positional state, the rear side of the lower face of the center seat 1 is brought into contact with the rear edge portion 58 of the bottom wall 35. Further, by fitting the recess 27 of the under cover 25 and the raised portion 55 of the bottom wall 35 in accordance with the downward inclination of the center seat 1 towards the front side, a sliding operation thereafter can smoothly be carried out without being shifted to left and right sides.

Figure 8:
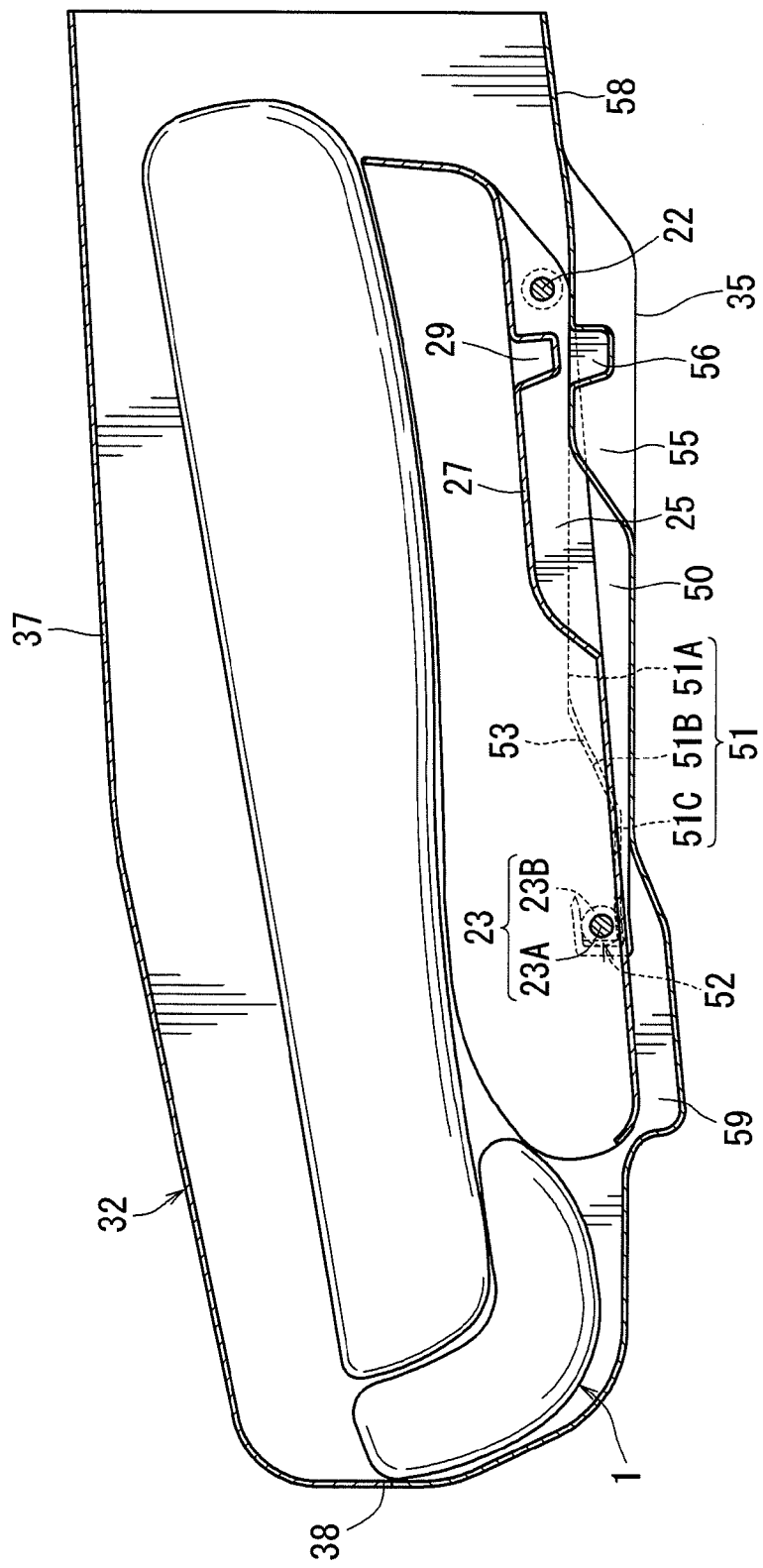
FIG. 8 is a sectional side view showing a state immediately before fixing the center seat inside of the storing space according to Embodiment 1.
Figure 9:
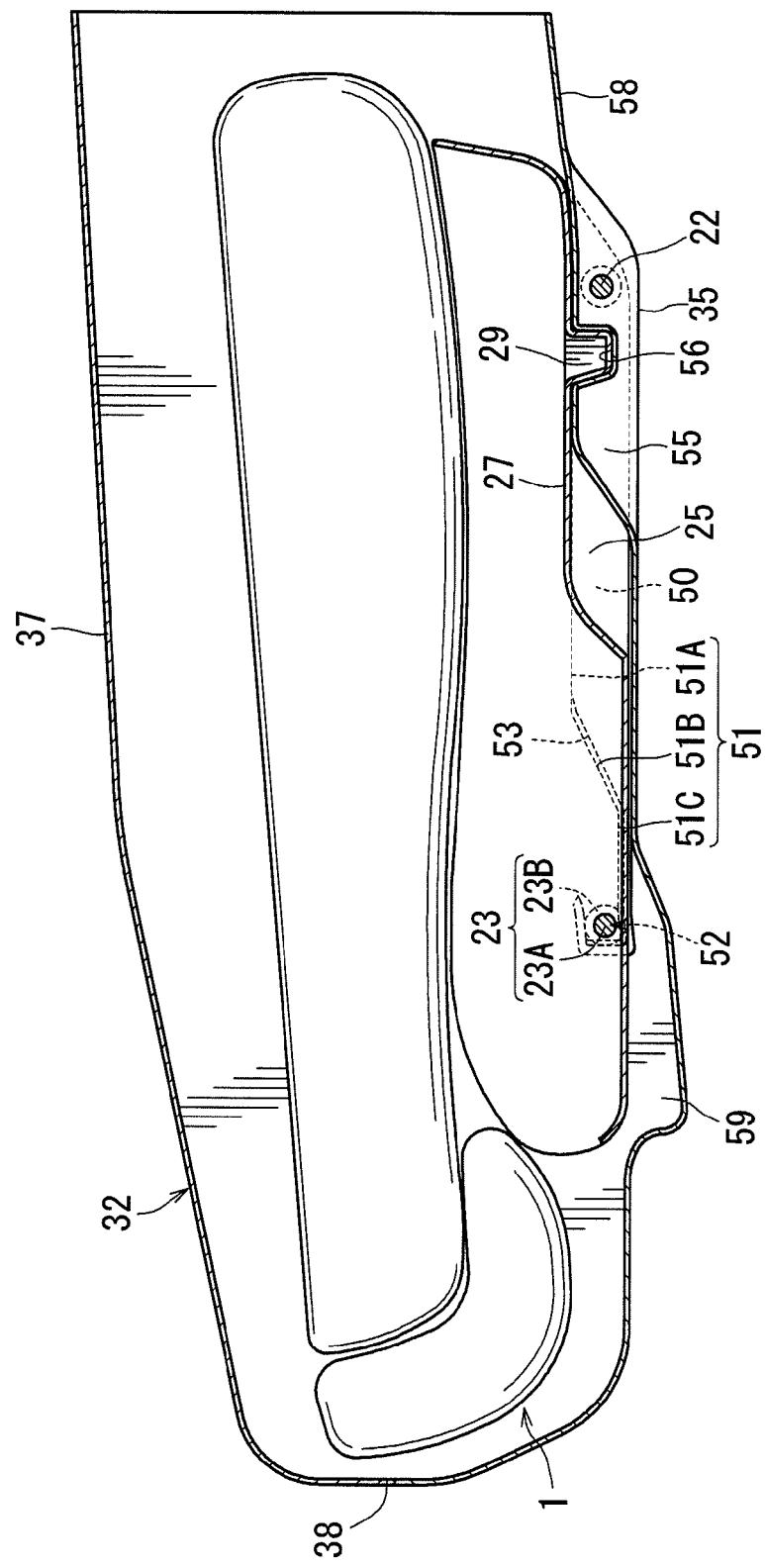
FIG. 9 is a sectional side view showing a storing structure of Embodiment 1.

Further, when the rear end of the lower face of the center seat 1 comes to the depth position from the rear end of the rear edge portion 58 of the bottom wall 35 by sliding the center seat 1 to the depth side of the container 32 from the state shown in FIG. 7, thereafter, the projection 29 of the under cover 25 of the center seat 1 is slid on the raised portion 55. Further, when the center seat 1 is slid further to the depth side of the container 32, as shown by FIG. 8, the lock pin 23 is butted to the fixing portion 52 of the depth end of the rail 51 and further sliding to the depth side is restricted. Although at the position, the center seat 1 is slid to the depth side while maintaining the inclined state, the recess portion 59 is formed to recess at the depth side of the bottom wall 35, and therefore, the front side of the center seat 1 being brought into contact with the bottom wall 35 to hamper sliding insertion is avoided. Finally, the rear side of the center seat 1 is lowered to the lower side of the state shown in FIG. 8, as shown by FIG. 9, the projection 29 of the center seat 1 is fitted to be fixed to the fitting recess portion 56 recessed at the raised portion 55 of the bottom wall 35. Further, although the projection 29 and the fitting recess portion 56 can be fitted to some degree even by naturally falling by the self weight of the center seat 1, in order to carry out the fitting further solidly, it is preferable to press the rear side of the center seat 1 to the lower side. At this occasion, the striker 22 arranged on the rear side of the center seat 1 is contained between the stretching portion 50 and a rearward inclined face of the bottom wall 35.

In this way, the center seat 1 is firmly fixed at inside of the containing space by the fixing portion 52 and the fitting recess portion 56 without being rattled in front and rear, left and right and up and down directions, and emittance of interference sound of the center seat 1 and the container 32 is restrained. Further, as is well shown in FIG. 9, a height dimension $H_4$ (refer to FIG. 5) from the bottom wall 35 (accurately, the recess portion 59) to an upper face on an inner side of the fixing portion 52 is larger than a height dimension from the lower face to the lock pin 23 of the center seat 1, accurately, a height dimension $H_5$ (refer to FIG. 5) from the lower face of the under cover 25 to the lower end of the flange portion 23B, and therefore, when the center seat 1 is contained to be fixed to inside of the containing space, the front side of the center seat 1 is brought into a state of being floated up at inside of the containing space. Therefore, a contact area of the center seat 1 and the container 32 is small, and therefore, even when a large impact is operated assumedly in running the vehicle or the like, emittance of interference sound of the center seat 1 and the container 32 is restrained as small as possible. Further, when the center seat 1 is slid to be inserted, it is not necessary to support the rear side of the center seat 1 by lifting the rear side to the upper side. Therefore, in order to store the center seat 1, only a force of sliding to operate the center seat 1 in the front and rear direction is needed, and therefore, the storing operation can easily be carried out.

Embodiment 2

Embodiment 2 is basically the same as preceding Embodiment 1, and differs therefrom only in that the stretching dimension $W_4$ of the stretching portions 50 formed by being stretched from the left and right side walls 36•36 of the container 32 is set to be larger than that of preceding Embodiment 1. That is, the width dimension $W_5$ between the left and right stretching portions 50•50 is set to be smaller than the width dimension $W_3$ of the bulged portion 26 of the under cover 25 of the center seat 1 and larger than the width dimension $W_1$ of the under cover 25 of the portion other than the bulged portion 26.

Thereby, when the center seat 1 is inserted to be slid into the container 32 from a front side thereof, the bulged portion 26 of the under cover 25 is slid to be moved above the horizontal portion 51A of the rail 51. At this occasion, the lock pin 23 is not brought into contact with the rail 51. Further, when the center seat 1 is moved to be slid to the depth side of the container 32, and the bulged portion 26 of the under cover 25 exceeds the fixing portion 52 of the rail 51, by dropping the front side of the center seat 1 to the lower side, the lock pin 23 is brought into contact with the rail 51. At this occasion, the lock pin 23 is dropped precisely on the inclined portion 51B of the rail 51, and therefore, at the same time, the flange portion 23B of the lock pin 23 is fitted to the groove 53 of the rail 51. Thereafter, the center seat 1 may be fixed to the container 32 by being operated to slide similar to preceding Embodiment 1.

Embodiment 3

Figure 10:
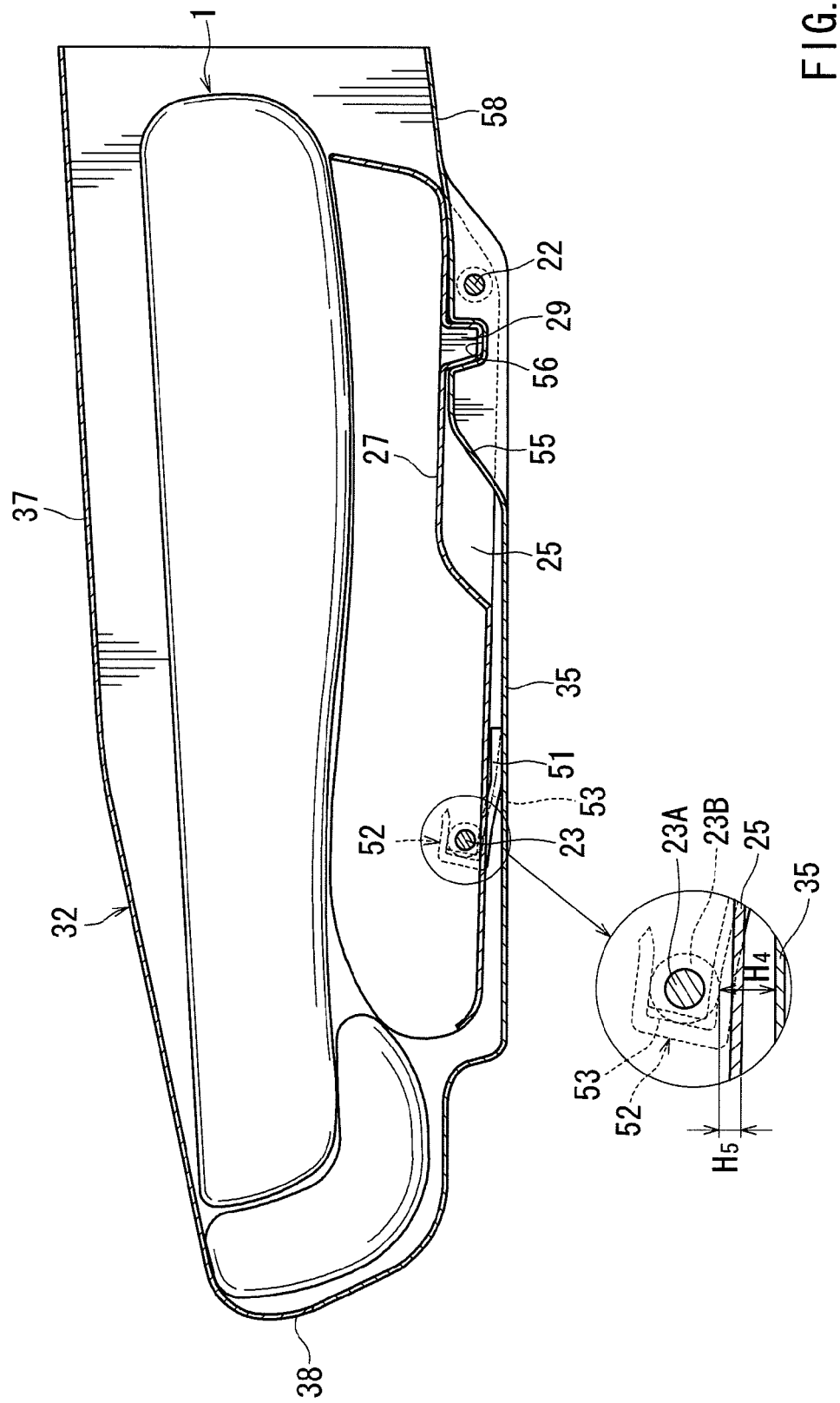
FIG. 10 is a sectional side view showing a storing structure of Embodiment 3.

Further, other than the storing structures of Embodiment 1 and Embodiment 2 described above, various modifications can be carried out within the range not deviated from the gist of the invention. For example, as Embodiment 3, as shown by FIG. 10, the lower face of the center seat 1 may be constituted to slide on the bottom wall 35 of the container 32 by abolishing the horizontal portion 51A of the rail 51. Even when the lower face of the center seat 1 is slid on the bottom wall 35 of the container 32 in this way, the recess 27 of the under cover 25 and the raised portion 55 of the bottom wall 35 are fitted to each other slidably in the front and rear direction, and therefore, the center seat 1 can be slid to be inserted thereinto without being shifted to left and right sides. Therefore, in order to firmly receive the lock pin 23, a start end (rear side) of the rail 51 is set to a height position of being brought into contact with the bottom wall 35. Also the groove 53 is formed from the start end of the rail 51 over to the fixing portion 52. In this case, the stretching portion 50 formed by being stretched from the side wall 36 is not necessarily needed. Further, in order to maintain the front side of the center seat 1 in an inclined attitude of being floated up from the bottom wall 35, the rail 51 is inclined in an upper direction towards the depth side. Thereby, the height dimension $H_4$ from the bottom wall 35 to the upper face of the inner side of the fixing portion 52 is made to be larger than the height dimension $H_5$ from the lower face of the center seat 1 to the lower end of the lock pin 23.

Further, on the rear side of the center seat 1, the projection 29 of the under cover 25 is continuously slid from the rear edge portion 58 of the bottom wall 35 to the raised portion 55. Further, the projection 29 may be fitted to be fixed to the fitting recess portion 56 by the self weight of the center seat 1 or by operating to push down the center seat 1 to the lower side simultaneously with butting the lock pin 23 to the fixing portion 52 of the rail 51. Further, according to Embodiment 3, it is not necessary to form the recess portion 59 at the depth side of the bottom wall 35 for two reasons, that there is not an operation of inclining the front side of the center seat 1 to the lower side, and that since the fixing portion 52 is inclined to the upper side, when the center seat 1 is stored to be fixed to inside of the storing space, the front side of the center seat 1 is floated up from the bottom wall 35. Further, the center seat 1 is fixed by being inclined at inside of the storing space, and therefore, the self weight of the center seat 1 is concentrated on the portion of fitting the projection 29 and the fitting recess portion 56, and therefore, it can be prevented that the projection 29 is easily drawn out from the fitting recess portion 56. The other aspects are similar to Embodiment 1.

Embodiment 4

Figure 11:
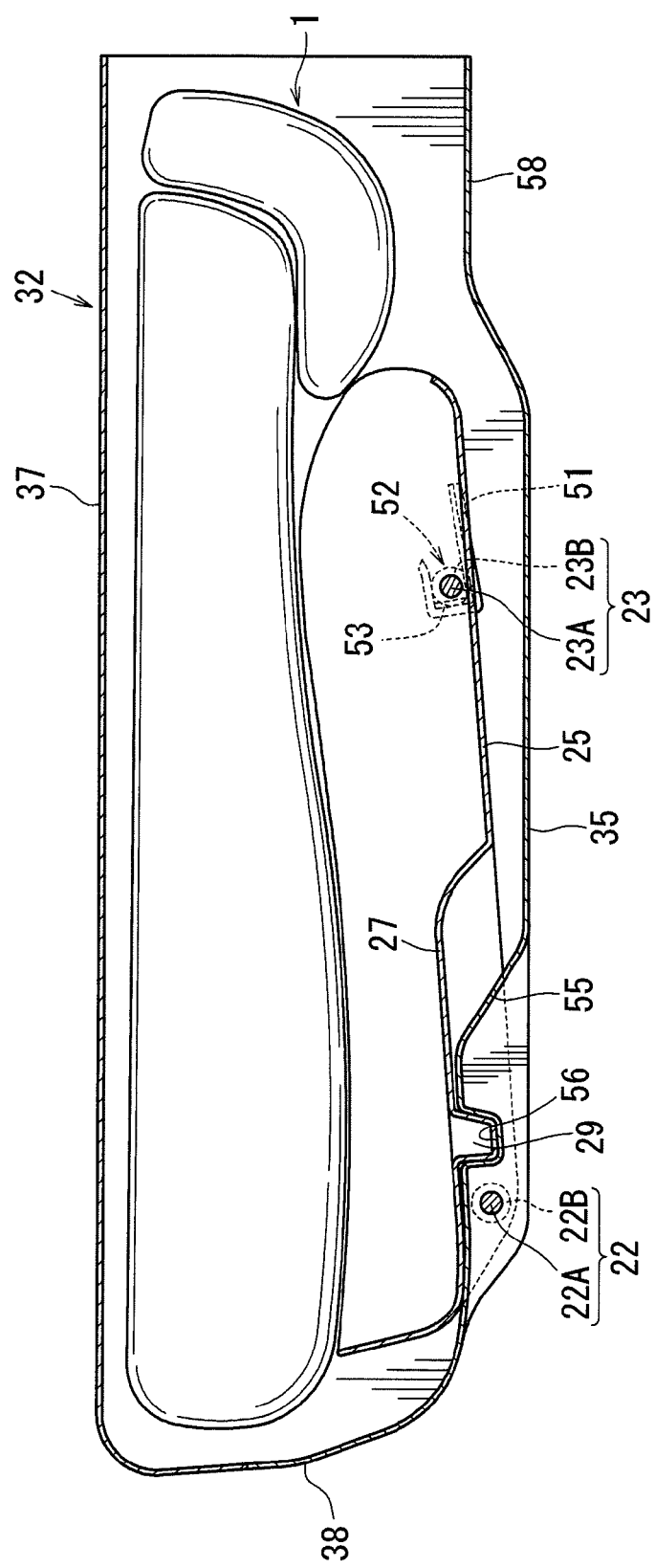
FIG. 11 is a sectional side view showing a storing structure of Embodiment 4.

Further, as Embodiment 4, as shown by FIG. 11, the center seat 1 may be slid to be inserted into the storing space from the rear side by forming the raised portion 55 of the bottom wall 35 on the depth side of the container 32 and forming the fixing portion 52 on the rear side (opening side) of the container 32. The structure is a structure which is particularly effective when there is constructed a constitution of operating to detach the center seat 1 from the support base 4 to the rear side, and when the storing space is provided on the rear side of the position of arranging the center seat 1. Therefore, according to the embodiment, there is also a case in which the console box 30 is not used as the container. For example, the storing space may be formed by recessing the floor 100 on the lower side of the third row seat 6.

In Embodiment 4, a height position of the lower end of the fixing portion 52 is provided at a position at least upward from the upper end of the flange portion 22B of the striker 22 so that when the center seat 1 is slid to be inserted into the storing space, the striker 22 arranged on the rear side of the center seat 1 is made to pass through the lower side of the rail 51 without being brought into contact therewith. Therefore, although the center seat 1 may be inserted horizontally while being slid above the bottom wall 35, when inserted to the depth side to some degree, it is necessary to engage the lock pin 23 to the fixing portion 52 by lifting the front side of the center seat 1 to the upper side. The rail 51 is formed by a short dimension, according to the fixing portion 52, a depth side thereof is inclined to the lower side in order to smoothly receive the lock pin 23, and in order to prevent the lock pin 23 from being drawn out. Further, receiving of the lock pin 23 is further facilitated by expanding to open an inlet of the fixing portion 52. The other aspects are similar to Embodiment 1, Other Modified Example Although modified examples or the like of the storing structure have been explained as described above, according to the invention, even other member can variously be modified. For example, the vehicular seat of the invention may be applied as a seat other than the second row center seat. Naturally, the invention is applicable not only to a vehicle aligned with three seats in a width direction but a vehicle aligned with two seats in the width direction. The support base in this case is not limited to a left side seat but may fixed to a right side seat, further, may be installed to be fixed onto the floor. Further, also positions of arranging the recess portion of locking the support base and the cushion lock apparatus are not limited to the illustrated positions. Although it is preferable to arrange the striker and the lock pin of the vehicular seat to the seat side, the engaging pin and the engaging hole may be provided reversely to the illustrated constitutions. That is, the engaging pin may be provided on the seat side and the engaging hole receiving the engaging pin may be provided on the support base side.

The opening of the storing space can be made to be openable and closable by a lid member. When the seat is not stored into the storing space, a board member which can be used as, for example, a simple table or the like can also be stored thereto.

The invention claimed is:

1. A structure for storing a vehicular seat comprising:
  a seat arranged attachably and detachably to a support base; and
  a storing space configured to store the seat detached from the support base when the seat is not used,
  wherein the seat is provided with an engaging member to mount and to fix the seat to the support base by engaging with an engaging portion provided at the support base,
  wherein the storing space is configured to store the seat by including a bottom wall, side walls erected to an upper side from two left and right side edges of the bottom wall, and a depth wall erected to the upper side from a depth edge of the bottom wall, and to enable the seat to slide,
  wherein a rail member for fixing the seat is provided inside of the storing space,
  wherein the rail member inside of the storing space is configured to slidingly receive and fix to the engaging member of the seat,
  wherein the engaging member of the seat is pin members that project at outer sides in a width direction from two left and right side faces of a lower portion of the seat, and
  wherein the rail member projects at inner sides in the width direction from the two left and right side walls of the storing space, and has fixing portions capable of fixing the pin members by surrounding the pin members from a lower side, a depth side and an upper side at a depth end of the rail member.

2. The structure for storing a vehicular seat according to claim 1,
  wherein a lower face of the seat is formed with a projection at a position on a side opposed to the engaging member in a front and rear direction,
  wherein the bottom wall of the storing space is formed with a recess portion in a shape in correspondence with the projection of the seat, and
  wherein the projection of the seat is fitted to the recess portion inside of the storing space when the seat is stored inside of the storing space.

3. The structure for storing a vehicular seat according to claim 2,
  wherein a height dimension from the bottom wall of the storing space to the fixing portions is larger than a height dimension from the lower face of the seat to the engaging member, and
  wherein when the seat is stored inside of the storing space, and the engaging member of the seat is supported by and fixed to the fixing portions of the rail member, a side of the engaging member of the seat is at a position raised from the bottom wall of the storing space.

4. The structure for storing a vehicular seat according to claim 3,
  wherein the engaging member of the seat comprises a pin portion in a shape of a round bar fixed to the seat, and a flange portion integrally formed with a front end of the pin portion, and
  wherein the fixing portions formed at the depth end of the rail member is formed with a groove capable of receiving the flange portion of the engaging member.

5. The structure for storing a vehicular seat according to claim 4,
  wherein the engaging member is provided at a side face of an under cover having a width narrower than a width dimension of the seat and covering the lower face of the seat, and
  wherein front ends of the engaging member are not projected to outer sides at least from left and right side faces of the seat.

6. The structure for storing a vehicular seat according to claim 5,
  wherein a front end portion of the under cover is formed with a bulged portion of a width wider than a rear portion of the under cover formed with the engaging member, and
  wherein left and right side faces of the bulged portion are disposed on inner sides in a width direction more than the front ends of the engaging members.

7. The structure for storing a vehicular seat according to claim 6,
  wherein a width dimension between the rail member formed at the two left and right side walls of the storing space is larger than the width dimension of the bulged portion of the under cover.

8. The structure for storing a vehicular seat according to claim 6,
  wherein a width dimension between the rail member formed at the two left and right side walls of the storing space is smaller than the width dimension of the bulged portion of the under cover.

9. The structure for storing a vehicular seat according to claim 6,
  wherein the projection is formed to project inside of the recess portion formed by being recessed to an upper side at a center portion in the width direction of the lower face of the under cover,
  wherein the recess portion of the storing space fitted to the projection is formed by being recessed into a raised portion formed in a shape of being raised to the upper side at a center portion in a width direction of the bottom wall of the storing space, and
  wherein a width dimension of the raised portion is slightly smaller than a width dimension of the recess portion of the under cover, and when the seat is slidably inserted inside of the storing space, the recess portion of the under cover is slidably fitted to the raised portion.

10. The structure for storing a vehicular seat according to claim 9, wherein the seat is a center seat installed between two left and right side seats arranged by being spaced apart from each other by a predetermined interval therebetween in a width direction in second row seats arranged in a front and rear direction of a vehicle, wherein the seat is operated to be detached from the support base to a front side of the vehicle, and wherein the storing space is a console box provided between two left and right first row seats, and an opening thereof for inserting the seat is formed on a rear side of the vehicle.

11. The structure for storing a vehicular seat according to claim 10,
wherein the rail member is provided on a depth side of the projection inside of the storing space.

12. The structure for storing a vehicular seat according to claim 11,
wherein the fixing portions of the rail member are inclined to the upper side.

13. The structure for storing a vehicular seat according to claim 9,
wherein the projection is provided on a depth side of the rail member inside of the storing space.

14. The structure for storing a vehicular seat according to claim 13,
wherein the rail member is inclined to a lower side.

* * * * *